United States Patent [19]

Böhnke et al.

[11] Patent Number: 4,780,208

[45] Date of Patent: Oct. 25, 1988

[54] PROCESS FOR PURIFICATION OF EFFLUENT

[75] Inventors: Botho Böhnke, Maria-Theresia-Allee 231, D-5100 Aachen; Bernd Diering, Aachen, both of Fed. Rep. of Germany

[73] Assignee: Botho Böhnke, Aachen, Fed. Rep. of Germany

[21] Appl. No.: 902,418

[22] Filed: Aug. 29, 1986

[51] Int. Cl.⁴ .................................................. C02F 3/30
[52] U.S. Cl. .................................... 210/605; 210/630; 210/631; 210/903; 210/906
[58] Field of Search ............... 210/605, 906, 620, 630, 210/903, 631

[56] References Cited

U.S. PATENT DOCUMENTS

| | | | |
|---|---|---|---|
| 3,236,766 | 2/1966 | Levin | 210/625 |
| 3,964,998 | 6/1976 | Barnard | 210/903 |
| 4,042,493 | 8/1977 | Matsch et al. | 210/906 |
| 4,141,822 | 2/1979 | Levin et al. | 210/906 |
| 4,431,543 | 2/1984 | Matsuo et al. | 210/605 |
| 4,460,470 | 7/1984 | Reimann | 210/605 |
| 4,487,697 | 12/1984 | Böhnke et al. | 210/903 |
| 4,568,462 | 2/1986 | Böhnke et al. | 210/605 |

FOREIGN PATENT DOCUMENTS

| | | | |
|---|---|---|---|
| 2908134 | 9/1980 | Fed. Rep. of Germany. | |
| 2640875 | 1/1983 | Fed. Rep. of Germany. | |
| 3328343 | 12/1983 | Fed. Rep. of Germany | 210/605 |
| 3317371 | 10/1984 | Fed. Rep. of Germany. | |
| 3427310 | 2/1985 | Fed. Rep. of Germany | 210/605 |
| 59-90690 | 5/1984 | Japan | 210/605 |
| 59-123597 | 7/1984 | Japan | 210/605 |
| 59-169599 | 9/1984 | Japan | 210/605 |
| 59-206092 | 11/1984 | Japan | 210/605 |

OTHER PUBLICATIONS

Biologische Phosphorelimination aus Abwasser, by J. H. Rensink and H. J. G. W. Donker, gwf-wasser/abwasser, (1984), pp. 238-245.

Primary Examiner—Benoit Castel
Attorney, Agent, or Firm—Herbert Dubno

[57] ABSTRACT

A process for the purification of effluent, in which the effluent to be purified is first introduced into a high-loaded activation stage operated as an adsorption stage, then is passed through an intermediate clarifier with sludge offtake and subsequently introduced into a low-loaded stage to which a final clarification stage with sludge offtake is connected. Microorganisms work in the adsorption stage. The sludge is maintained in the initiation phase by means of the sludge takeoff from the intermediate clarification stage. Nitrification and subsequently denitrification can be carried out in the low-loaded stage. Sludge from the intermediate clarification stage can be reintroduced as recycled sludge into the adsorption stage, and sludge from the final clarification stage can be re-introduced as recycled sludge into the low-loaded stage. Also excess sludge is drawn off and thickened. The effluent is first treated in the adsorption stage under optionally-anaerobic conditions and before it flows out into the intermediate clarification stage is treated under aerobic conditions. The turbid water from sludge thickening and sludge de-watering is treated with precipitating agents before it is re-conveyed to the inflow of the filter plant.

8 Claims, 1 Drawing Sheet

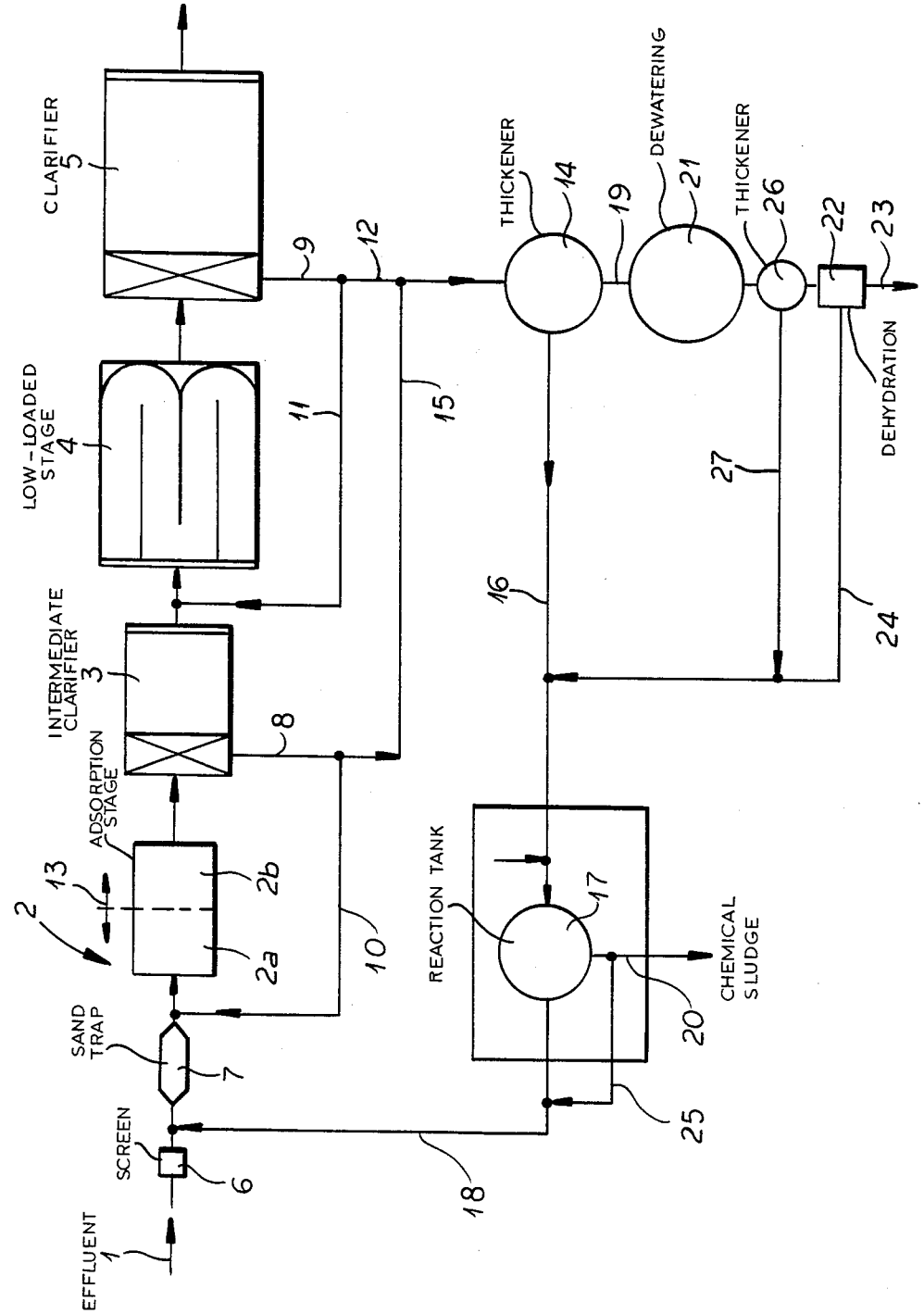

PROCESS FOR PURIFICATION OF EFFLUENT

CROSS REFERENCE TO RELATED SUBJECT MATTER

This application is related to earlier applications which have matured into U.S. Pat. No. 4,487,697 of Dec. 11, 1984 and U.S. Pat. No. 4,568,462 of Feb. 4, 1986.

FIELD OF THE INVENTION

Our present invention generically relates to a process for the purification of effluent, particularly a communal effluent.

BACKGROUND OF THE INVENTION

An effluent to be purified can be introduced into a high-loaded activation stage, operated as an adsorption stage, then passed through an intermediate clarifier with sludge offtake and subsequently introduced into a low-loaded stage to which a final clarification stage with sludge offtake is connected.

Optionally, anaerobic microorganisms can work in the adsorption stage and the sludge can be maintained in the initiation phase by means of the sludge offtake from the intermediate clarification stage.

Nitrification and subsequently denitrification can be carried out in the low-loaded stage. Additionally, sludge from the intermediate clarifier can be introduced as recycled sludge into the adsorption stage and sludge from the final clarification stage can be introduced as recycled sludge into the low-loaded stage, excess sludge being drawn off and thickened.

The "adsorption stage" signifies a biological stage that is equipped as a high-loaded activation stage, e.g. with the following parameters:

Volume loading $L_V = 2$–$20$ kg $BOD_5/m^3 \cdot d$,

Dry substance content $DS_V = 1$–$10$ kg/m3, and a

Dry sludge loading $L_{DS}$ equal to or greater than 2 kg $BOD_5$/kg DS·d preferably $L_{DS} = 0.15$ kg $BOD_5$/kg DS·d In this respect the invention starts from the features known in the practice of A-technology (adsorption waste treatment, see German patent No. 26 40 875).

The low-loaded stage can be an activation tank but it can also be a trickle filter stage plus activation tank. As a rule, but not necessarily, one operates with separation of the bacterial colonies between the adsorption stage and the low-loaded stage, and this particularly in such a way that sludge from the low-loaded stage is not fed back into the adsorption stage.

The term "stage" also covers aggregates of several tanks or basins, several trickle filter installations and the like, which however are operated in the same way or practically in the same way in individual stages.

Phosphorus elimination has already been achieved with the known generic process (German Offenlegungsschrift No. 26 40 875). It is of the order of a phosphorus content amounting to 1 to 4% of the dry weight of the withdrawn sludge, which is regarded as the conventional phosphorus elimination level of A-technology.

If greater phosphorus elimination levels are required, other techniques are used in practice. The so-called Phostrip process is known (U.S. Pat. Nos. 3,236,766; 4,042,493; 4,141,822) in which part of the recycled sludge is passed through an anaerobic tank, where the phosphates are stripped out by washing with water. The phosphorus is removed from this washing water by precipitation with lime.

In addition, the so-called Bardenpho process is known (U.S. Pat. No. 3,964,998). This relates to a process for the biological removal of nitrogen and phosphorus. The process operates with five stages connected in series in the form of different types of tanks or zones of tanks. The anaerobic conditions necessary for the elimination of phosphorus are present in the first stage.

As the recycled sludge is also conducted into the first stage, care must be taken that it contains no nitrate. The nitrates that are formed in the first aerobic tanks are conveyed with the feedback into the first anoxic tank where they are denitrified, after which further movement into the aerobic stage takes place. The feedback level amounts to about 400%.

After this circulation the mixture of effluent and activated sludge is conveyed into the second anoxic stage where the remaining nitrates are denitrified. In order to avoid anaerobic conditions in the final clarification, to improve the capacity of the sludge to settle, and to remove small adhering nitrogen bubbles, a second aeration stage is necessary. In an aerobic procedure, of course, dissolved oxygen is present in the effluent that is to be treated. Under anoxic working conditions, however, although dissolved oxygen can no longer be found in the effluent to be treated, nevertheless oxygen is present is combined form as $NO_3-$ or as $NO_2$. Anaerobic conditions are present when neither dissolved oxygen not combined oxygen in the form of $NO_3$ or $NO_2$ is present.

OBJECT OF THE INVENTION

It is an object of the invention to provide a process for the treatment of waste water whereby phosphorus elimination can be effected to a degree considerably greater than that of conventional phosphorus elimination, in which the special installations necessary for phosphorus elimination as found in the Phostrip process or the Bardenpho process are entirely completely absent or are restricted to the installation for P-precipitation of the phosphorus contained in the turbid water or the filtrate water.

SUMMARY OF THE INVENTION

According to the invention, the mixture of effluent and activated sludge is first treated in the adsorption stage under anaerobic conditions and before it flows out into the intermediate clarification stage is treated under aerobic conditions, and that the microorganisms are subjected both to the anaerobic and to the aerobic conditions.

The microorganisms that according to the invention work in the adsorption stage are preferably and principally protocytes (German Offenlegungsschrift No. 33 17 371) and thus optionally anaerobic or optionally aerobic microorganisms. Anaerobic conditions means a set of conditions in which, although circulation of the mixture of effluent and activated sludge takes place, yet no dissolved oxygen and no oxygen combined as $NO_3$ or $NO_2$ is present. Aerobic conditions, according to the invention, means a method of procedure in which a quantity of oxygen appears that is clearly greater than zero and is at least 0.2 mg/liter or on the average 1.0 mg $O_2$/liter. It is obvious that the effluent flowing into tne adsorption stage can carry nitrogen compounds with it.

However, immediately after inflow the anaerobic conditions, that according to the invention control the process, are established.

The invention makes use of the fact that phosphorus is not decomposed in a clarification plant but can only be discharged with the sludge. Thus high elimination of phosphorus can only be obtained by on one hand a quantity of sludge that is as great as possible and on the other hand by maximum possible phosphorus content in the sludge.

The quantity of excess sludge produced in a biological effluent purification process is dependent on the content of C-compounds in the inflow of effluent. In this respect the invention makes use of the fact that the A-technology works in the A-stage with a very great excess sludge yield in relation to the $BOD_5$ elimination. In fact an excess sludge yield in the region of 2 to 3 kg DS/kg $BOD_5$ (decomposed) is achieved.

In many installations the excess sludge yield is of the order of 2.6 to 2.7 kg DS/kg $BOD_5$. It is obvious that in the following low-loaded stage the excess sludge yield is smaller than this.

The invention is based on the discovery that in the A-range, in addition to the known effects, a more extensive biological phosphorus elimination can be brought about.

Under the conditions according to the invention tne microorganisms in the A-stage are induced to store more phosphorus in the cell than is necessary for metabolism.

The quantity of phosphorus necessary for cell-building is of the order of at least 1 g of phosphorus per 100 g or $BOD_5$, which would correspond to a phosphorus content of about 1% in the dry mass of the activated sludge.

In contrast to this the conventional phosphorus elimination level of the A-technology, as stated above, is in fact of the order of 1 to 4% phosphorus content in the dry mass of the excess sludge that is withdrawn.

Surprisingly the microorganisms in the A-stage react to the stress situations described in the form of alternate anaerobic and aerobic conditions in such a way that under aerobic conditions they store up increased amounts of polyphosphates.

The biological interpretation of this state of affairs assumes that in the anaerobic zone the microorganisms turn these stored polyphosphates into ATP by means of which they maintain their metabolism.

According to the invention however a portion of the sludge is withdrawn after the effluent has been subjected to aerobic conditions for some time and is introduced into the intermediate clarification stage.

Consequently the excess phosphorus taken up by the microorganisms is removed from the system. It is possible to attain phosphorus elimination levels such that the phosphorus content of the dry mass of the withdrawn excess sludge amounts to up to 8%.

The procedure according to the invention that initially works under anaerobic conditions and subsequently under aerobic conditions can be realized in various ways.

One embodiment of the invention, notable for its simplicity, is characterized in that in the adsorption stage a section that comes first in the direction of flow of effluent is operated anaerobically and a second section is operated aerobically. The two sections follow one another in the directions of flow of effluent. The boundary between the sections can be variable and can be suited to different operating conditions. Arrangements can also be made for the adsorption stage to be operated alternately anaerobically and aerobically for successive periods, this being taken with the proviso that transfer into the intermediate clarifier takes place following aerobic operation and if necessary as anaerobic operation is re-established. As a rule the effluent is subjected to anaerobic conditions for a period of about $\frac{1}{3}$ to $\frac{2}{3}$ of the time that it remains in the high-loaded tank and to aerobic conditions for the rest of the time. On the average, the period that the effluent remains in the adsorption stage is about 30 minutes. The age of the sludge in the adsorption stage should be between 2 and 12 hours, and here if the sludge age is very short a greater yield of excess sludge can be achieved.

If one operates according to the teaching of the invention an excess sludge is formed which contains the phosphorus to a large extent in the form of compounds so that the phosphorus is removed from the flow of effluent. If the excess sludge is thickened and the turbid water from the thickener cannot be immediately discharged then the invention recommends that the turbid water from the thickener and the filtrate water should be introduced into a reaction tank and treated with means to precipitate phosphates and that the fluid flow from the reaction tank should be re-conveyed to the inflow of effluent to the A-stage.

In summary, the advantages achieved are to be seen in that by the process according to the invention phosphorus can be removed with a very high degree of elimination by means of an installation that conforms with A-technology.

This depends on the low sludge age in the A-stage with high yield of excess sludge. This occurs because according to the invention stress situations are created in the A-stage for the microorganisms operating there that lead to a high phosphorus content in the sludge, if this is drawn off as stated.

A quantity of 5% and more of acinetobacter bacteria is found in the A-stage when this is operated according to the invention, which accounts for the increased biological elimination of phosphorus.

Of particular advantage is the fact that problems of nitrification and denitrification do not occur. Nitrogen elimination takes place much more in the low-loaded stages, where the necessary high sludge age exists.

According to the invention the tasks of P-elimination and N-elimination are shared amongst the different biological colonies of the high-loaded stage and the low-loaded stage. For optimum biological P-elimination and for preferential furtherance of the formation of adapted and mutated strains of bacteria the high-loaded stage must be an activation stage, while the activation stage can also be a trickle filter.

BRIEF DESCRIPTION OF THE DRAWING

The above and other objects features and advantages of the invention will become apparent from the following description reference being made to the accompanying drawing, the sole FIGURE of which is a flow diagram of tee process.

SPECIFIC DESCRIPTION AND EXAMPLE

The diagram shows the basic conveyance of effluent from its inflow to its outflow, according to arrow 1. This relates to an installation for the purification of communal effluent.

An adsorption stage 2, that is operated as a high-loaded activation stage, is seen together with an intermediate clarification stage 3 and low-loaded stage 4.

The adsorption stage 2 preferably operates under the following conditions:

Excess sludge yield: 2.6–2.7 kg DS/kg $BOD_5$
Volume loading ($L_V$): about 10 kg $BOD_5 m^3 \cdot d$
Dry substance (DS): 1–10 kg/m$^3$
DS loading ($L_{DS}$): at least 2 kg$BOD_5$/kg DS·d.
Sludge age: about 6 hours
anaerobic operation: about 50% of time in A stage
aerobic operation: about 50% of time in A stage
P content DS: about 8%
Effluent residence: about 30 minutes A final clarification stage 5 follows the low-loaded stage 4.

The low-loading stage 4 operates under the following conditions:

Volume loading ($L_V$) about 1 kg $BOD_5/m^3 \cdot d$
Dry substance (DS): 2–5 kg/m$^3$
DS loading ($L_{DS}$): 0.15 kg $BOD_5$/kg DS·d.

A grating 6 and a sandtrap 7 precede the adsorption stage 2.

The intermediate clarification stage 3 possesses a sludge take-off 8 and the final clarification stage 5 possesses a sludge take-off 9.

The bacterial colonies are separated between adsorption stage 2 and low-loaded stage 4, i.e. no excess sludge or return sludge from low-loaded stage 4 is carried back into adsorption stage 2.

Optionally anaerobic microorganisms are active in adsorption stage 2. In low-loaded stage 4 nitrification and thereafter denitrification can be carried out. In the example of performance low-loaded stage 4 is an activation tank. Sludge from intermediate clarification stage 3 can be conveyed back into adsorption stage 2 as returned sludge, this being through pipe 10.

Sludge from final clarification stage 5 can be reintroduced into low-loaded stage 4 as returned sludge, this being through pipe 11. Excess sludge can also be drawn off at 12.

The effluent is first subjected to anaerobic conditions in adsorption stage 2 and before it flows into intermediate clarification stage 3 is, for the reasons given, subjected to aerobic conditions. In the example of performance shown in the FIGURE the arrangement is so contrived that in adsorption stage 2 a first section 2a, in the direction of flow of effluent, is operated anaerobically and a second section 2b is operated aerobically. The boundary between the two sections is variable, this is indicated in the diagram by double-headed arrow 13. The boundary can be moved according to operational requirements.

In the example of performance the excess sludge from adsorption stage 2 and that from low-loaded stage 4 can be conveyed together or separately to a thickener 14, this being through pipes 12 and 15. The turbid water from the thickener is introduced into a reaction tank 17 via pipe 16 and is there treated with precipitating agents for the precipitation of phosphates. The precipitating agents may be selected from the group consisting of CaO, Ca(OH)$_2$, an alkaline-earth metal salt, an iron salt and an aluminum salt. The liquid outflow from this reaction tank 17 is conveyed back through pipe 18 to the effluent inflow. The result is that on one hand activated sludge is drawn off through 19 and on the other hand chemical sludge with high phosphorus content is drawn off through 20. The digested sludge in septic tank 21 has to be de-watered. This takes place in the dehydration station 22. The sludge after de-watering is drawn off at 23 and is either used in agriculture or goes to the dump. The filtrate produced by de-watering is conveyed via pipe 24 to reaction tank 17.

A final thickener 26 is located between septic tank 21 and de-watering at 22. The liquid drawn off here returns via pipe 27 to the reaction tank. Outflow 20 from the reaction tank can also be conveyed back via pipe 25.

We claim:

1. A process for the purification of an effluent comprising the steps of:

(a) introducing said effluent in admixture with recycled sludge into a highly loaded activation stage operated as an adsorption stage;

(b) subjecting the contents of said highly loaded activation stage initially to biodegradation by microorganisms under anaerobic conditions for a period $\frac{1}{3}$ to $\frac{2}{3}$ of the total time that the effluent is in said highly loaded activation stage;

(c) thereafter subjecting the mixture in said highly loaded activation stage to biodegradation under aerobic conditions for the balance of said total time, the microorganisms in the mixture being subjected both to said anaerobic and said aerobic conditions, said microorganisms principally being protocytes;

(d) passing the mixture from said highly loaded activation stage, after subjecting it to biodegradation under aerobic conditions, into an intermediate clarifier with sludge offtake and recycling to step (a) so as to maintain a low sludge age in said highly loaded activation stage;

(e) passing effluent from said intermediate clarifier into a low-loaded activation stage with recycled sludge and effecting biological nitrification and, upon recycling a mixture of effluent and sludge, a biological denitrification in said low-loaded activation stage;

(f) separating sludge in a final clarifier from a purified effluent of the mixture resulting from said low-loaded activation stage and recycling a portion of the sludge thus separated to said low-loaded activation stage;

(g) collecting and thickening excess sludge from said clarifiers;

(h) precipitating phosphate from said turbid water;

(i) filtering water from the thickened sludge to form a filtrate; and (j) returning water decanted from the precipitate formed in step (h) and the filtrate formed in step (i) to the effluent introduced in step (a) to said highly loaded activation stage.

2. The process defined in claim 1 wherein said highly loaded activation stage is provided with a first basin section and a second basin section traversed in succession by a mixture of effluent and sludge therein, said first section being operated anaerobically and said second section being operated aerobically.

3. The process defined in claim 1 wherein said highly loaded activation stage is operated anaerobically and aerobically alternately and the mixture from said highly loaded activation stage is passed to said intermediate clarifier immediately following aerobic operation.

4. The process defined in claim 3 wherein the mixture from said highly loaded activation stage is passed to said intermediate clarifier immediately following aerobic operation and as anaerobic operation is being reestablished.

5. The process defined in claim 1 wherein the precipitation in step (h) is effected by adding to the turbid water at least one precipitating agent selected from the group which consists of CaO, Ca(OH)$_2$, an alkaline-earth metal salt, an iron salt and an aluminum salt.

6. The process defined in claim 1 wherein the filtrate formed in step (i) is subjected to precipitation of phosphate as in step (h) before it is returned in step (j) to said highly loaded activation stage.

7. The process defined in claim 1 wherein the precipitate formed in step (h) is introduced to said highly loaded activation stage.

8. A process according to claim 1 wherein said protocyte is an acinetobacter bacteria.

* * * * *